United States Patent [19]

Roever

[11] 4,189,771

[45] Feb. 19, 1980

[54] METHOD AND MEANS FOR THE DETECTION OF DEADLOCK AMONG WAITING TASKS IN A MULTIPROCESSING, MULTIPROGRAMMING CPU ENVIRONMENT

[75] Inventor: Paul R. Roever, Sunnyvale, Calif.

[73] Assignee: International Business Machines Corporation, Armonk, N.Y.

[21] Appl. No.: 841,163

[22] Filed: Oct. 11, 1977

[51] Int. Cl.$^2$ ............................................... G06F 9/18
[52] U.S. Cl. .................................... 364/300; 364/200
[58] Field of Search ... 364/200 MS File, 900 MS File, 364/300

[56] References Cited

U.S. PATENT DOCUMENTS

| | | | |
|---|---|---|---|
| 3,593,300 | 7/1971 | Driscoll | 364/200 |
| 3,643,222 | 2/1972 | Smith et al. | 364/200 |
| 3,648,252 | 3/1972 | Thron et al. | 364/200 |
| 3,648,253 | 3/1972 | Mullery et al. | 364/200 |
| 4,047,161 | 9/1977 | Davis | 364/200 |

OTHER PUBLICATIONS

Lum, "Deadlock Detection and Breaking", IBM T.D.B. vol. 13, No. 12, May 1971, pp. 3799, 3800.
Collier, "Algorithm for Detection of System Deadlocks", IBM T.D.B., vol. 12, No. 2, 7/1969, pp. 357–359.
Olbermarck, "Deadlock Detecting Enqueue-Dequeue", IBM T.D.B. vol. 13, No. 12, 1/71, pp. 2338, 2339.
Witt, "The Functional Structure of OS/360-Joband Task Management"; IBM Systems Journal, vol. 5, No. 1, 1966, pp. 12–29.

*Primary Examiner*—Mark E. Nusbaum
*Attorney, Agent, or Firm*—R. Bruce Brodie

[57] ABSTRACT

The wait relations among N tasks in a multiprocessing, multiprogramming CPU environment are conformed to a vector of N+1 fields recording which tasks in a system are active and upon what other task any given task directly waits. The vector may be stored in a global register. Positions 1 through N are assigned to the N tasks such that a value p in position r means that task r is waiting directly on task p. One value j of the possible values $0, 1, 2, \ldots, N+1$ is designated to indicate an active task. Position j always shows the value j. Without loss of generality and to facilitate the discussion j is assumed to be 0. Thus, the value 0 in register position r means that task r is not waiting and position 0 always has the value 0.

The presence of any deadlocks (closures) among the wait relations can always be detected by the computing system by making repeated translations of the vector fields within and upon themselves in no more than $\lceil \log_2(N+1) \rceil$ iterations. In this regard, $\lceil \log_2(N+1) \rceil$ denotes the smallest integer equal to or greater than the base 2 logarithm. The translation of fields within and upon themselves means that for each global register position r containing pointer p, then the contents g of register position p are substituted as the new contents of position r for the iteration $0 \leq r, p, g \leq N$.

6 Claims, No Drawings

METHOD AND MEANS FOR THE DETECTION OF DEADLOCK AMONG WAITING TASKS IN A MULTIPROCESSING, MULTIPROGRAMMING CPU ENVIRONMENT

BACKGROUND OF THE INVENTION

This invention relates to the control of concurrent processes in a multiprocessing, multiprogramming CPU environment, and more particularly, to the detection of deadlocks among waiting tasks thereof.

As used in this specification, the term "computing system" includes a CPU with main store, input/output channel control units, direct access storage devices, and other I/O devices coupled thereto such as described in G. M. Amdahl, et al, U.S. Pat. No. 3,400,371, issued Sept. 3, 1968 and entitled, "Data Processing System". A "task" is taken to mean an independent unit of work that can compete for the "resources" of a computing system. A "task control block" is a consolidation of control information pertaining to a task including any user assigned priority and its state i.e. active or waiting. The "wait state" is a condition of a task that is dependent upon the execution of other tasks in order for said "waiting" task to become "active".

Also, in this specification, a "resource" is any facility of a computing system or of an "operating system" running thereon which is required for the execution of a task. Typical resources include main store, I/O devices, the CPU, data sets, and control or processing programs. In this regard, an "operating system" consists of a set of supervisory routines running on a computing system for providing at least one of the following functions: determining the order in which requesting tasks or their computations will be carried out, providing long term storage of data sets including programs, protecting said data sets from unauthorized access or usage, and/or system logging and recovery.

"Multiprogramming", which pertains to the concurrent execution of two or more programs by a computing system can be managed on a computer running under IBM System/360 Operating System as described in IBM Publication GC28-6646, July 1973 and listed in IBM System/360 Bibliography GA22-6822. Relatedly, such modern operating systems, by permitting more than one task to be performed concurrently, make possible more efficient use of resources. If a program that is being executed to accomplish a task must be delayed, for example, until more data is read into the CPU, then performance of some other completely independent task can proceed. The CPU can execute another program or even execute the same program so as to satisfy another task.

In the competition for serially reusable resources, a task is said to be "deadlocked" if its progress is blocked indefinitely because it is stuck in a "circular wait" upon other tasks. In this circumstance, each task is holding a "non-preemptible" resource which must be acquired by some other task in order to proceed i.e. each task in the circle is waiting upon some other task to release its claim on a resource. The characteristics of deadlock then are mutual exclusion, non-preemption, and resource waiting. Mutual exclusivity implies that a task claims exclusive control over the resources it uses. Non-preemption connotes that a task does not release resources it holds until it completes use of them. Lately, resource waiting occurs because each task holds resources while waiting for others to release resources.

There are, as pointed out by Coffman and Denning, "Operating Systems Theory", 1973, Prentice Hall, at page 46, several approaches to dealing with deadlocks. These approaches may respectively involve prevention, detection and recovery, or avoidance. This is particularized by A. C. Shaw, "The Logical Design of Operating Systems", 1974, Prentice Hall at pages 227-232 and 215-224. Shaw observes that the general approach of the art to deadlock prevention is to restrict the system such as by permitting only one task at a time to utilize resources. However, to permit multiprogramming operation, a more practical restriction would be to require each task to name its resources only at its creation. Tasks with allocated resources then would never be blocked because they cannot reference other resources and eventually will release them to the resource pool. The disadvantages of this deadlock prevention/avoidance policy are that it presupposes that the extent and order of resource use can be completely specified beforehand and that the resources are tied up for unnecessarily long times. For instance, a task may specify resources in the order a, b, c when the order due may be b, c, a. Also, resource c may be used only in the last portion of time alloted to the task. Some of the disadvantages have been overcome by J. W. Havender, "Avoiding Deadlock in Multitasking Systems", 1968, IBM Systems Journal 74-84 by an "ordered" resource policy.

Both Coffman and Shaw emphasize the role of "detection" in the success of deadlock resolution in multiprogramming computer systems. Indeed, Coffman in a subsequent discussion, "System Deadlocks", June 1971, Computing Surveys at pages 67-78 considers wait relations among tasks including those in which tasks may directly wait on two or more other tasks. In the general case, Coffman's execution time for deadlock detection among N tasks is proportional to $N^2$. Also, in Coffman's modified version, the detection time is a linear function of $N+(R \log R)$, where $(R \log R)$ is the time required to sort R resources. Lastly, the Coffman method requires at detection time the knowledge of resources in addition to data concerning task identity and their wait relations.

Obermarck in the IBM Technical Disclosure Bulletin, Vol. 12 at pages 2338-2339 in 1971 described the use of a matrix in which the row and column coincidence between a requestor and resource owner, together with the table entry, determine deadlock. Also, P. Roever in Vol. 16 of the IBM Technical Disclosure Bulletin at pages 1243-1244 in 1973 utilized a matrix only where the tasks were waiting in a circle A→B→C→D→A. In this latter case, the method involved the step of detecting a submatrix having nonzero rows and columns.

SUMMARY OF THE INVENTION

It is accordingly an object of this invention to detect any deadlocks among N tasks in a multiprogramming, multiprocessing CPU environment. It is a related object that in the detection of deadlock, only data concerning the wait relations among the tasks be primarily relied upon rather than information concerning resources. While deadlock detection may involve iterative operations, it is still another object that the number of iterations to detect deadlock is small, and in fact $\leq \lceil \log_2(N+1) \rceil$. It is yet a further object that the invention be implementable either within an assembly level language instruction set of contemporary computing systems or as a new assembly (machine) level instruction. Lastly, it is an object that the invention be invocable by any system running on the computer such as an operating system (OS) and/or a data base system (DB).

The above objects are satisfied by a method and means in which the wait relations among the N tasks are constrained such that each task directly waits, at most, upon one other task. The method comprises the steps of creating a field of N+1 pointers in a register, the pointers and their position order within said register defining the wait relations among the tasks, an arbitrary jth register position being specially assigned the value j. The next method step includes translating the field with and upon itself such that for each register position r containing a pointer p, then the contents g of register position p are substituted as the new contents of position r for the iteration, $0 \leq r,p,q \leq N$. The very next method steps are those of testing the register for the occurrence of at least one non-j pointer; and repeating the translating and testing steps upon detection of at least one non-j pointer until the set of non-j pointers would remain the same from one iteration to the next, such result being indicative of closure or deadlock.

In this invention, the register is position ordered 0,1,2, ...,N. The value p in register position r is interpreted as task r waiting upon task p. Similarly, the value r in position r implies that task r is waiting upon itself. Significantly, the method of the invention calls for selecting one (the jth) of the N+1 register positions in an arbitrary manner and inserting the value "j" therein and associating this special position j with an imaginary task j. While this means that task j is waiting upon itself, it also signifies that should the method steps yield an all j result, then there is no closure i.e. no deadlock. Furthermore, if "j" occurs in position r, it is interpreted that task r is active (not waiting). Now, if, for example, j is set equal to 0, then position 0 must always contain the value 0. Consequently, the value (pointer) 0 in any other register position will mean an active task. Thus, an all 0 method result connotes "no deadlock".

Since the relations among tasks are constrained to have each task wait directly upon, at most, one other task, then the relations may be represented by an out-degree-one graph. Deadlock is shown by any path closing upon itself. It follows from this fact and the inventive method that closure can be detected within $\lceil \log_2(N+1) \rceil$ translations of the field (vector equivalent of the graph) within and upon itself. After $\lceil \log_2(N+1) \rceil$ translations, closure is indicated by the presence of at least one register position containing a non j (a nonzero) value.

By slight modification, the number of translations needed to detect closure can be further reduced. The modification comprises the steps of assigning or reassigning pointer values indicative of tasks to specific register positions in such a manner that for each pair of tasks p,q for which task p is waiting upon task q, then task q is assigned a numerically lower register position than the register position assigned to task p. This position assignment or reassignment is executed prior to the step of translation.

DESCRIPTION OF THE PREFERRED EMBODIMENT

The Detection Concept by Way of Selected Examples

The machine implementable method of the invention may be more fully appreciated by consideration of the following examples and as embodied in IBM System 360 machine instructions said instructions being described in the aforementioned Amdahl patent herewith incorporated reference, U.S. Pat. No. 3,400,371.

EXAMPLE 1

Let tasks a,b,c,d,e,f,g wait upon one another as follows:

$$a \rightarrow b \rightarrow c \rightarrow d \rightarrow e \rightarrow f \rightarrow g \circlearrowleft$$

This would be represented in a register field:

| Pointer  | j | b | c | d | e | f | g | j |
|----------|---|---|---|---|---|---|---|---|
| Position | j | a | b | c | d | e | f | g |

$= t(x)$

Position j is the arbitrary position containing pointer value j connoting among other things as a pointer value the associated task is active i.e. task g is not waiting upon another task. The N tasks are a,b,c,...,f while the (N+1)st task is task j. According to the method, by translating the field within and upon itself $\lceil \log_2(N+1) \rceil$ times, a value other than j will be indicative of closure. However, since it is known that there is no closure, then after $\lceil \log_2(N+1) \rceil = \log_2 8 = 3$ translations, the vector should contain only j's.

| Pointer  | j | c | d | e | f | g | j | j |
|----------|---|---|---|---|---|---|---|---|
| Position | j | a | b | c | d | e | f | g |

$= t^2(x)$ 1st translation

| Pointer  | j | e | f | g | j | j | j | j |
|----------|---|---|---|---|---|---|---|---|
| Position | j | a | b | c | d | e | f | g |

$= t^3(x)$ 2nd translation

| Pointer  | j | j | j | j | j | j | j | j |
|----------|---|---|---|---|---|---|---|---|
| Position | j | a | b | c | d | e | f | g |

$= t^4(x)$ 3rd translation

The translation of any field $t^i(x)$ to $t^{i+1}(x)$ is accomplished for each register position r containing pointer p, by substituting the contents g of position p as the new contents of position r for the iteration $0 \leq r,p,g \leq N$.

Applying this principle to the several translations in example 1, it will be apparent in field t(x) that position "a" contains pointer "b". However, position "b" contains value "c". Thus, the new value to be placed in position "a" in field $t^2(x)$ is "c". Taking the pointer "f" of position "e" in t(x). The new value "g" to be placed in position "e" in $t^2(x)$ was the value in position "f" in t(x). The substitutions are easily followed resulting in the all j result in the third translation.

EXAMPLE 2

Let tasks a,b,c,...,h wait upon each other as follows:

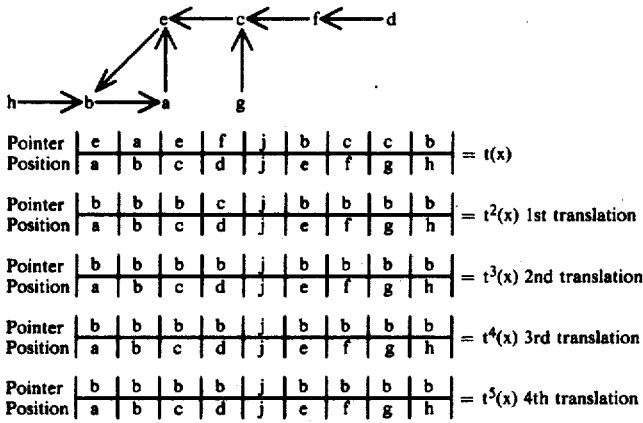

In this example, $N+1=9$ and $\lceil \log_2(N+1)\rceil = 4$. Position j was deliberately inserted mid-way in the register position order to illustrate that arbitrary placement does not affect the outcome. By the second translation, a non-j result indicative of closure is apparent. Of interest is the fact that all of the positions have non-j pointers. Of further interest is the fact that the result obtained after the second translation does not change in subsequent translation indicating that $\lceil \log_2(N+1)\rceil$ is an upper limit and not necessarily the required number of translations.

EXAMPLE 3

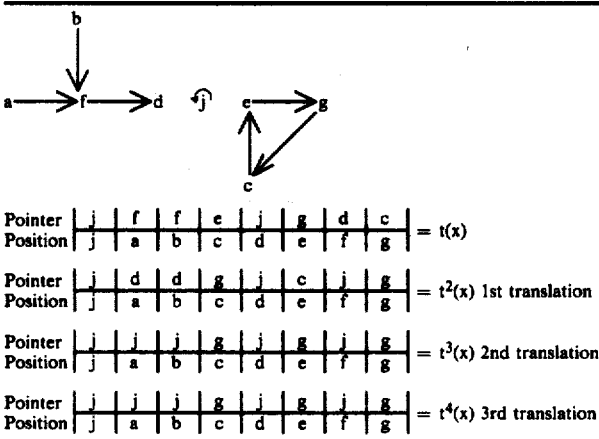

This case shows two clusters of tasks of which only tasks c,e, and g are in a circular wait relation. For $N+1=8$, then $\log_2(N+1)=3$. It is apparent that non-j pointers have stabilized by the third translation. From this exercise, task g is identified as being at least one member of the wait loop.

In an operating system having a component governing the allocation of resources to tasks, one strategy for deadlock prevention/avoidance is to test the effect of a task requesting an otherwise unavailable resource being transferred into a wait state. If a deadlock would ensue, then the task is not transferred.

A variation in the method resulting in a reduction in the number of translation steps needed to detect closure is obtained by reassigning pointer values indicative of tasks to specific register positions in such a manner that for each pair of tasks p,q for which task p is waiting upon task q, then task q is assigned a numerically lower position than task p in the register. This position assignment is made prior to the translation step. In this invention, j is always assigned the value 0. Therefore, register position 0 has a zero value.

Examining this variation more particularly, if for all pairs of tasks p,q such that p waits on q, it follows that p has a lower position than q, then the following steps in this variation are taken to detect deadlock whenever a previously active task A attempts to wait on a task B. First, it must be determined whether task B currently occupies a lower position in the register than task A. If this is the case, then no deadlock can result because no circular chain of pointers is possible. Consequently, task A is allowed to wait on task B and its position is made to point to task B's position.

If task B has a numerically higher position than task A, then for deadlock detection purposes, A's pointer value is temporarily inserted as the value in A's position. The execution of only one TRANSLATE of the register contents with and upon itself will yield a stable result. This obtains since all register positions contain values pointing to lower positions. Thus, the TRANSLATE step, proceeding from lower to higher register positions utilizes maximum efficiency. Next, it must be determined from inspection of the pointer value in task B's position, whether there exists a deadlock (if it shows A's position) or not (if it shows 0). In case no deadlock is shown, task A is allowed to wait upon task B after a reassignment of tasks to positions has taken place, such that again for each pair p,q of tasks including A and B, it follows that if p is waiting on q, then q has a lower position than p.

The Role of the TRANSLATE Instruction

The inventive method may be implemented, for instance, on an IBM System/360 digital computer of the type described for example, in Amdahl et al, U.S. Pat. No. 3,400,371, "Data Processing System" issued on Sept. 3, 1968. The TRANSLATE instruction which can be used to test the transitive closure is described on column 90 lines 25-52 using a format set forth on column 88 lines 16-56 having a microcode logic embodied in FIGS. 5NA1 to 5NA3.

The TRANSLATE instruction as a machine level function is likewise specified respectively in IBM 360 and 370 Principles of Operation, IBM Publications GA22-6821-8 and GA22-7000-4 (9th Edition, November 1970 and 4th Edition, Setp. 1974). The instruction has the following format:

| Field | TR Op. Code | List Size | Addn of Operand 2 | Addn of Operand 1 |
|---|---|---|---|---|
| Byte Position | 0 | 8 | 16  20 | 32  36 47 |

The eight bit bytes of the first operand are used as arguments to reference the list designated by the second operand address. Each eight bit function byte selected from the list replaces the corresponding argument in the first operand. The bytes of the first operand are selected one by one for translation, proceeding left to right. Each argument byte is added to the initial second operand address. The addition is performed following the rules of address arithmetic, with the argument byte treated as an eight bit unsigned integer. The sum is used as the address of the function byte, which then replaces the original argument byte.

Properties of the Iteratively Applied Translation Step

Prior to describing the preferred detailed embodiment, the question arises as to what is the underlying property or nature of the iteratively applied translation step which should always show closure. In this regard, one observes that a translate table, if none of its values lie outside the argument range, describes a finite function, all powers of which are defined. The term "powers of a function" refers to the iterative application of that function, such as in $f(f(f(x)))$, shortly denoted as $f^3(x)$. For such functions, for any given value p within the argument range, it follows that the sequence $f(p)$, $f^2(p)$, $f^3(p)$, ... becomes period for $i \geq N$, N being the length of the argument range.

Significantly after m translations of a field defining a finite function f within and upon itself, the positions p will show $f^{[2^m + e]}(p)$ with $e \geq 0$.

Since $f(p) = f^{[2^* + 0]}(p)$, the statement is true for $m = 0$.

Without loss of generality, the induction step from m to $m+1$ can be shown through an example.

Assume the statement to be true for $m = 2$, so that position p will show $f^{[4+a]}(p) = q$ and position q has $f^{[4+b]}(q) = r$. It can be seen that the next translation $(m = 3)$ will provide p with $f^{[8+c]}(p)$. If $p \leq q$, translating position p gives $f^{[4+b]}f^{[4+a]}(p) = f^{[8+c]}(p)$. If however $q < P$, then position q will have been translated already, showing $f^{[8+d]}(q)$ when position p is processed. Therefore p is provided with $f^{[8+d]}f^{[4+a]}(p) = f^{[8+4+e]}(p) = f^{[8+c']}(p)$.

For a sequence $f(p)$, $f^2(p)$, ..., the values occurring after it becomes periodic are called the final values related with position p. With that definition, it can be stated:

After $\log_2(N)$ translations of a table with and upon itself, all positions show (one of) their final values. This proposition follows, because (according to the first statement $\log_2(N)$ translations provide position p with $f^{[N+e]}(p)$ and because $f^i(p)$ is periodic for $i \geq N$.

For deadlock checking, translate fields (tables) can be used such that task p waiting on task t is expressed as $f(p) = t$, and task p being active may be expressed as $f(p) = j$ and for $j = 0$ then $f(p) = 0$. From this, the directly waited-upon tasks and all indirectly waited-upon tasks for a task p looking at $f(p)$, $f^2(p)$, $f^3(p)$, ... etc. can be found.

With this convention, a task is active or (perhaps indirectly) waiting for an active task, if and only if its (one and only) final value is j. The value j can be set equal to 0. For active tasks, this is true, because $j = f(p) = f^2(p) = f^3(p) = \ldots$ For tasks p waiting on an active task q, it is also true because for some i, $f^i(p) = q$ and $j = f^{[i+1]}(p) = f^{[1+2]}(p) = \ldots$.

Since by definition a task is in deadlock, if and only if it is not active and not waiting on an active task, it can be said that tasks are in deadlock if and only if their (one and only) final value is j. As shown above, this can be checked through $\log_2(N+1)$ translations. A task is not in deadlock if and only if $\log_2(N+1)$ translations its position shows a "j" result.

Conversely, if after $\log_2(N+1)$ translations a position p shows a non-zero value q, the task p is involved in deadlock and the value q shown is one of its final values. This means that task p is (perhaps indirectly) waiting on task q and that for some i and d, $q = f^i(p) = f^{[i+d]}(p)$. Since $f^i(p) = q$, we have $f^d(q) = q$, which says q is (perhaps indirectly) waiting upon itself. In other words, task p is either a member of or waiting upon a member of a loop of waiting tasks. Task q is a member of this loop. While a task may have several final values, two tasks having the same final non-zero value are both (perhaps indirectly) waiting on the same task (because f is a function).

Characteristics of a Data Base or Operating System

As previously mentioned, this invention may be advantageously practiced on a computing system of the IBM System/360 type in which a sequence of machine instructions implementing the method may be used as part of an operating or data base system. In the subsequent discussion, both the steps of the invention and its use in a relevant portion of a data base system will be described.

A data base management system is intended to be utilized in an operating system environment that contains conventional data management facilities, manages auxiliary storage and provides traditional program language compiler capabilities. One typical operating system is the conversational monitoring system (CMS). This forms a part of IBM VM370 and is described in IBM Publication "Virtual Machine Facility/370; Command Language Guide", No. GC20-1804, Fifth Edition published in May 1975.

A data base system may include a transaction management component exercising such functions as resource scheduling, authorization, and recovery. Also included is a lock manager. The lock management element reviews the compatability of lock requests while the unlock management element focuses on deadlock detection. The LOCK/UNLOCK manager treats task synchronizing, more particularly, the control or release of serially reusable resources by tasks. In the above named CMS operating system, LOCK/UNLOCK is controlled by two macro instructions ENQ and DEQ respectively.

The ENQ macro instruction requests the control program to symbolically assign control of one or more serially reusable resources to the active task. Each resource is represented by a unique name combination. The control program does not correlate the name combination with an actual resource. Thus, access to a resource is logically, not physically restricted. That is, tasks may use a serially reusable resource without using the ENQ macro instruction, but in doing so may jeopardize program reliability.

If any of the resources are not available (that is, have been specified in an exclusive ENQ request and not specified in a subsequent DEQ request) and this is an unconditional request, the active task is placed in a wait condition until all of the requested resources are available. If the ENQ request is conditional, control is immediately returned to the active task. Once control of a resource is symbolically assigned to a task, it remains with that task until one of the programs of that task issues a DEQ macro instruction specifying the same resource.

The ENQ macro instruction may also be used to determine the status of a resource; that is, whether the resource is immediately available or in use, and whether control has been previously requested for the active task in another ENQ macro instruction.

The DEQ macro instruction is used to remove control of one or more serially reusable resources from the active task. It can also be used to determine whether control of the resource is currently assigned to or requested for the active task. A preselected register may be set to zero if the request is satisfied.

In the implementation as used in a data base system, if any task requests a resource and the request cannot be satisfied immediately, then a test is performed to determine whether if the requesting task is made to wait it would result in a deadlock. If "yes", then steps must be taken to prevent or avoid "deadlock" such as by backing out and restarting the requesting task.

LOCK/UNLOCK MANAGER

The task request for a resource would be invoked by an ENQ macro and specify an 8 character name representing a selected resource. Control passes to the LOCK/UNLOCK manager. The LOCK/UNLOCK manager checks through the task control blocks to see if the resource name had appeared anywhere in the string of control blocks. If the name is listed, this is indicative of prior activity. It may result in a task having to wait (be placed in wait state). Before the Data Base System (LOCK/UNLOCK Manager) advises the CMS operating system to make the task wait, a pass is made through the deadlock detection method. This has as previously stated, the purpose of determining whether making the task wait would result in deadlock. Parenthetically, if the name were not on the list, then the requesting task could be given "ownership" (exclusive use) of the LOCK to that resource. After this control passes.

The Embodiment

In this embodiment, there exists a block of information called Enqueue Element (NQE) for each resource that is currently locked. Each NQE includes:
(1) an 8 character name
(2) the identification of the using (owning) task
(3) a pointer to the task control block governing task execution A predetermined number (25) NQE's are collected into a single group. Groups can be chained together with suitable pointers (links). This structure is declared in statements 0052-0058 of the instruction sequence in Table 2. The field or vector of tasks waiting upon other tasks is named "WAIT-LIST" and is declared in statement 0050. A work area is called WORKLIST and is declared in statement 0051. The data may be conveniently depicted in Table 1:

TABLE 1

WAITLIST [ 256 bytes ]
WORKLIST [ 256 bytes ]
NQEB
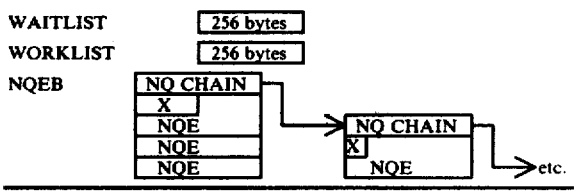

It is intended that each ENQ instruction constitutes a request for a resource lock and uses one of the NQE's. Parenthetically, the number of NQE's is equal to the number of locks currently in use.

The code is recited in Table 2 followed by a statement by statement explanation of its purpose or effect. Although the statements are arbitrarily numbered, it is understood that certain segments must precede other segments. For example, data declarations must precede the passing of control and the operation upon the data. Relatedly, statements 50-57, 544-557, 565-570 are written in a PL/1 type of language. In this regard, reference may be made to PL/I(F), IBM System/360 Operating System Language Reference Manual, IBM Publication No. GC 28-8201-4, fifth edition 1972. Also statements 571-580 are made in IBM System 360 machine (assembly) code as previously mentioned.

Table 2

| DECLARE STATEMENTS FOR ENQ/DEQ AND DEADLOCK | |
|---|---|
| Statement Number | Statement |
| 0051 | DECLARE WORKLIST (256) BINARY (8) BOUNDARY (BYTE); |
| 0052 | DECLARE  1 NQEB BASED (R1), |
| 0053 |   2 NQCHAIN POINTER, |
| 0054 |   2 NQRES BINARY (15), |
| 0055 |   2 NQE (25), |
| 0056 |     3 NQNAME CHAR (8) |

Table 2-continued
DECLARE STATEMENTS FOR ENQ/DEQ AND DEADLOCK

| Statement Number | Statement |
|---|---|
| 0057 | 3 NQOWNER BINARY (8) BOUNDARY (BYTE), |
| 0058 | 3 NQDISPEL BINARY (8) BOUNDARY (BYTE); |

TABLE 3
ENQ-GATE-DEQ LOGIC

```
0544  ENQ:
0545    FREENQEB=0;
0546    R1=ADOR(NQEB1);
0547  NQESRCH:
0548    DO I=1 TO 25;
0549    IF NQNAME(I,1)=FF' X & FREENQEB=0 THEN DO;
0550      FREENQE=1;
0551      FREENQEB=R1;
0552    END;
0553    ELSE DO;
0554      IF NQNAME(I)=RCBARG1 THEN DO;/*ARE THE
              NAMES EQUAL*/
0555        IF RCBRTYPE=23 THEN GO TO DODEQ;
0556        WORKLIST(WUAID+1)=NQOWNER(I);
0557        WUAID=WUAID+1;
0558        DEDISPL(CURRDE)='0'B,
```

TABLE 4

```
0556  WORKLIST(1)=0;
0567  R2=WUIDS-1;
0568  J=R2;
0569  GENERATE SETS(WORKLIST,J,R2)
0570  REFS(MVC,TR,CLC,WAITLIST,
      DEADLOCK);
      TRANSFER OF CONTROL TO
      DEADLOCK DETECTION LOGIC
```

TABLE 5
DEADLOCK DETECTION LOGIC

| 0575 | EX | R2,TR | Execute a "translation", length in R2 |
| 0576 | SRA | J,1 | Shift rt. reg. J. by 1 |
| 0577 | BNZ | *,−8 | Branch not zero |
| 0578 | BCTR | R2,0 | Decrement R2 by 1 |
| 0579 | EX | R2,CLC | Execute compare logical character |
| 0580 | BNE | DEADLOCK | Branch not equal (to zero) |
| 0581 | & | Endgen; | |

TABLE 6
POST DETECTION LOGIC AND MISCELLANY

```
0585  WAUDE→DEDISPL (1) = '0 'B;
0586  R15 = ADDR (SWITCH);
0587  GEN CODE (BALR 14,15);
0588  R14 = RCBSAVE (4)
0589  RETURN;
0590  END;
0591    END;
0592    END;
0593    IF NQCHAIN = 0 THEN DO:
0594      R1 = NQCHAIN;
0595      GO TO = NQESRCH;
0596    END;
0597  IF RCBRTYPE = 21 / RCBRTYPE = 23 THEN RETURN;
0614    GO TO DOENQ
0637  DEADLOCK:
0638    GENERATE;
0639    GETCB TYPE = RCB
0640    MESSAGE ID=
0640
0640
0648  TR TR WORKLIST (0), WORKLIST
0649  CLC CLC WORKLIST + 1 (0), WORKLIST
0650    & ENDGEN;
```

Tables 2 through 6 consist of segments or series of consecutively numbered statements. The statement numbers are relative. By this is meant that the statement numbers in Table 2 running from 0050 through 0058 could have just as easily have been 1450 through 1458. However, the sequence in Table 3 is meant to follow that in Table 2 and likewise the sequences in Tables 4, 5 and 6 follow in that order also.

As previously mentioned, contemporary operating systems and data base systems include high level language compilers and linkage editors so that sequences written in high level procedure oriented languages such as PL/1 type may be readily converted into machine instructions. Compiler and linkage editor design for PL/1 type languages are well within the state of the art and beyond the scope of this invention. It is believed that a proper appreciation of the invention, method and means for deadlock detection, would be enhanced by describing a typical lock/unlock manager having the responsibility of invoking the deadlock detection logic. This lock/unlock (ENQ/DEQ) manager is set forth in sequences of PL/1 type language in Tables 2–4 and 6. In contrast, the deadlock detection logic shown in Table 5 is described in the machine code of the Amdahl patent.

An explanation of some of the terms will assist in understanding the code sequences.

The term "RCBARG1" identifies the resource (an 8 character name) to be locked. The name is purely arbitrary since it is the name that causes the locking. Therefore, tasks that use the same resource all use the same name. The requesting task will acquire ownership of the resource if it is free. Other tasks will not be allowed access to it. If the resource was not available, then some other task has ENQed it. The requesting task will wait for the resource to be DEQed by the using task. If a waiting task would cause a deadlock with a different task, this requesting task will be backed out and restarted if possible.

The term "RCBARG2" is a parameter such that if a task was forced to wait for a resource and this argument is nonzero, the non-blank completion code will be returned when the ENQ is satisfied. A zero RCBARG2 will suppress the completion code.

DECLARE Statements for ENQ/DEQ and Deadlock Detection

Referring now to Table 2, statements 0050 through 0058 consist of a sequence of DECLARE statements. This belongs to a class of procedure statements in the PL/1 type language. A procedure statement must have a label, and the entire procedure may be referred to by that label or procedure name. More particularly, the DECLARE statement supplies necessary information to the operating system/data base system PL/1 type compiler so that storage areas can be reserved for the data represented by the names used in the procedure. A DECLARE statement describes the characteristics of the data assigned to each variable. A name described in a DECLARE statement is said to be "declared" and the words used to describe the characteristics of the data are called attributes. The significance of the names in statements 0050 through 0056 is apparent from reference to Table 1. The name NQOWNER refers to the task requesting a named resource. The term NQDISTEL consists of a pointer to the task control block (TCB) of the requesting task.

The segment in Table 2 is decoded in order to determine which service is required. If it is clear that a task is requesting a resource, then control is passed to statement 0544 in Table 3.

ENQ/GATE/DEQ Logic

ENQ referencing the lock manager is treated as a label. This means that the label is an identifier written as a prefix to a statement so that, during execution, program control can be transferred to that statement through a reference to its label. Statement 0545 represents the finding of the first free NQE in a group of NQE's. The addresses initialized to zero. If a free NQE is found, its address will replace the zero i.e FREENQEB=ADDRESS. Statement 0546 recites the fact that the address of the first block of NQE has been acquired.

Statement 0547 contains the label NQESRCH for the DO group recited in statements 0548 through 0552. The DO group has the function of searching to see if the requested resource name is present in the first block of 25 NQE's. Relatedly, a DO group is a sequence of statements whose beginning is defined by a DO statement and whose end is defined by an END statement. When a DO group is used as a THEN clause in an IF statement, all of the statements of the DO group are executed before a skip is made or all of the statements are skipped and the ELSE clause is executed. When a DO group is used as the ELSE clause, all of the statements of that group are skipped after the THEN clause is executed.

Statement 0548 initiates the search of the first block of 25 NQE's. The IF, THEN statement 0549 can be construed such that if the name of an NQE is the special flag ('FF'X) meaning that the NQE is not in use and a free NQE has not been yet found (FREENQUEB=0), then execute the DO portion of the statement.

In 0551, the expression "FREENQEB=R1" implies saving the NQE address. If the requested resource is not currently held, then this is the NQE that should be used to represent possession. The ELSE DO statement 0553 states that if the NQE represents a locked resource, then "something else" must be done. The "something else" is to be found in statements 0554 through 0557. In 0554, if the name in the NQE equals the name being requrested, and according to statement 0555, if an ENQ is requested, then per statement 0556, the requesting task will have to wait. The task number of the resource owner (NQOWNER) is the identification of the task to be waited upon. It is placed into the vector WAITLIST in the position associated with the requestor (WUAID+1). Lastly, in statement 0557, the requesting task is forced to eventually wait. If a wait is to occur, then it is necessary to test whether a deadlock would occur if transferring the task to the wait state were to be given effect.

Transfer of Control to Deadlock Detection Logic

The PL/1 type statement sequence in Table 4 adverts to the transfer of control to the deadlock detection logic. In statement 0566, the WORKLIST position 1 is set to zero. In statements 0567 and 0568, the number of possible tasks (WUIDS-1) is placed in an arbitrary register R2 and register J. This is the binary value (N), the $\log_2$ of which determines the minimum number of translate instructions TR necessary to execute in order to detect closure. Finally, statements 0569 and 0570 condition the presence of the necessary data and the machine instructions for the execution of deadlock detection logic in IBM System 360, 370 machine language as set forth in the statements 0574–0580 in Table 5.

Deadlock Prevention or Avoidance

It is useful to recall that the end result of the deadlock detection logic for purposes of this embodiment is that if the result field comprises all zeroes, then there is no closure or deadlock. However, the position of the non-zero bytes, indicates deadlock and serves also to identify some of the task numbers within the inner circle of closure. To determine all the members of the inner circle, then a value from the result would have to be selected and then "chased" through the original task waiting vector. This may be of assistance in the selection of the optimum victim task for deadlock resolution. In the lock/unlock manager used as an illustrative operating system or data base system for this invention, a task can acquire ownership of a resource if it is free. Other tasks will not be allowed access to it. If a resource is not available to a requesting task, then some other task as enqueued it. The requesting task will wait for the resource to be dequeued by the other task. If waiting would cause a deadlock with a different task, then the requesting task will be backed out and restarted if possible. This may be partly restated such that if causing a task to wait would result in deadlock, then the principle of victim selection is to "shoot the requesting task" by backing said task out and restarting.

Deadlock Detection Logic Per Se

Central to the execution of the deadlock detection logic is the translate instruction. As previously discussed, the TRANSLATE instruction is a System 360 machine instruction having a length field specified with it, i.e. a maximum of 256 bytes representing 256 task identities.

Since the number of tasks to be tested for deadlock may *dynamically* vary, for instance N=15 at time 1 and N=150 at time 2, the TRANSLATE instruction is not directly involved. Rather, it is involved through the EXECUTE instruction, specifying the appropriate length at any given time. The EXECUTE instruction permits the execution of any IBM System 360 instruction INDIRECTLY and may modify certain characteristics of the target instruction such as the length of operands.

The TRANSLATE (TR) instruction uses each byte in the SOURCE field to index a byte from the target table. The selected byte from the target table replaces the index from SOURCE. The operation proceeds from left to right one byte at a time, until all L bytes of SOURCE have been translated. The TRANSLATE table, TARGET, is addressed by adding each source byte to the address of the second operand, that is, to the initial address of the translation table. This general function of TRANSLATE is illustrated as follows:

| Pointer  | 1 | 4 | 3 | 0 | 3 | 1 | 5 | 2 | 2 | 6 | TARGET |
|----------|---|---|---|---|---|---|---|---|---|---|--------|
| Position | 0 | 1 | 2 | 3 | 4 | 5 | 6 | 7 | 8 | 9 |        |

| Pointer  | 3 | 6 | 4 | 9 | 8 | 3 | 6 | SOURCE BEFORE |
|----------|---|---|---|---|---|---|---|---------------|
| Position | 0 | 1 | 2 | 3 | 4 | 5 | 6 | TRANSLATION   |

| Pointer  | 0 | 5 | 3 | 6 | 2 | 0 | 5 | SOURCE AFTER |
|----------|---|---|---|---|---|---|---|--------------|
| Position | 0 | 1 | 2 | 3 | 4 | 5 | 6 | TRANSLATION  |

Position 0 in the source contains the pointer 3. Reference is then made to position 3 in the target and its value 0 is placed as the counterpart pointer to position 0 to the source after translation. This may be seen for position 1 containing pointer 6. The target value 5 from position 6 is inserted in position 1 in the source after translation. The remaining values may be obtained by the same protocol. In contrast to the general case, DEADLOCK DETECTION LOGIC employs the instruction specially. This is because the source and target are one and the same fields. The field being translated in the special case is the translate table for its own translation.

The DEADLOCK DETECTION LOGIC calls for three types of machine branching instructions. These are BRANCH NOT ZERO (BNZ) and BRANCH NOT EQUAL (BNE) to transfer control. In the case of the first branch type control is transferred back to the EXECUTE instruction. In the case of the second branch type, control is passed to a sequence of instructions for handling a detected deadlock. The BRANCH ON COUNT (BCTR) is used with the special no-branch option and merely decrements the contents of register R2 by 1.

Referring now to Table 5, statement 0574 is the execution of the move instruction in which the contents of the storage locations WAITLIST are moved to the storage location labeled WORKLIST. The length of the move is the value of R2. The move instruction may be found at statement 0647. Statement 0575 references the execution of the translate instruction which can actually be found at statement 0648. Relatedly, the number of translations is governed by the expression $\log_2(N+1)$. This function is performed by the SRA instruction in statement 0576. That is, after the execution of each translate instruction, the contents of the J register are shifted right by one position. The value of this register is tested by the BNZ instruction in statement 0577. If the count is non-zero, another translation is required so that the branch goes back to statement 0575. If the count is zero, then the next statement to be executed is 0578. Here the BRANCH instruction BCTR decrements the contents of register R2 for a system 360 instruction length requirement. The ultimate statement 0579 compares the result of the translate instruction to see if the elements are all zero. If they are not, then the statement BNE (Branch Not Equal to zero) causes a jump to statement 0637 (Table 6) to handle the deadlock. Parenthetically, deadlock is a label and statements 0638 through 0644 may illustrate the fact that additional statements for undertaking the resolution are required.

If the result is all zeroes such that a deadlock will not occur, then the dispatching element control block address is determined in statement 0585 shown in Table 6. Statement 0586 and 0587 pass control to another statement in order to permit the requesting task to be transferred to a wait status.

Of interest, statement 0592 refers back to statement 0555 in table 3. This means that a NQE has not been found and that a search must be continued within the given block of 25 NQE's. Statements 0593 through 0596 indicate that a NQE block is exhausted. If another block exists, it is necessary to return to statement 0547 also in Table 3 in order to search the next block of 25 NQE's. Statement 0597 is a DEQ or GATE. A DEQ results in a resource being returned to a resource pool. A gate does not lock on a resource but prevents further processing if a task has ENQed on that resource. This arises where some tasks do not require that the resources be held exclusively but that said resources should be not be accessed until some other task has ENQed on them.

While the invention has been particularly shown and described with reference to the detection of prospective task deadlock, it can also be seasonably used for confirming the existence of suspected deadlock. The described and other embodiments will be understood by those skilled in the art and that the foregoing and other changes in form and detail may be made therein without departing from the spirit and scope of the invention.

What is claimed is:

1. A method for detecting deadlocks among N tasks in a multiprocessing, multiprogramming CPU environment in which any one task is constrained to wait upon, at most, one other task, the method comprising the steps of:
   creating a vectored representation of task waiting relations including the steps of:
   loading in a register a field of N+1 pointers, the pointers and their position order within said register defining wait relations among the tasks;
   assigning to the j th register position the pointer value j;
   reiteratively executing at least one selected CPU instruction operating upon the vectored representation including the steps of
   translating the field of pointers with and upon itself including the steps of:
   substituting the contents g of register position p for each register position r containing a pointer p;
   continuing said substituting step for the iteration where r, p and g lie in the range greater than or equal to 0 and less than or equal to N;
   testing the register for the occurrence of at least one pointer whose value is not equal to j;
   upon the detection of at least one non-j pointer repeating the translating and testing steps until the set of non-j pointers would remain the same from one iteration to the next, such result being indicative of closure or deadlock and
   alerting at least one CPU of said closure or deadlock.

2. A method according to claim 1 wherein the number of repetitions of the translating and testing steps in order to detect closure is less than or equal to $\lceil \log_2(N+1) \rceil$.

3. A method according to claim 1, wherein upon j being set equal to zero, then register position zero must always contain the value zero, whereby the pointer value zero in any other register position denotes an active task with an all zero method result connoting no closure.

4. A method for detecting deadlocks in a multiprogramming, multiprocessing CPU environment in which any one of N tasks is constrained to wait upon, at most one other task, the method comprising the steps of:
   creating a vectored representation of task waiting relations in a field of N+1 pointers in a register, the pointers and their position order within said register defining the wait relations among the tasks;
   assigning task pointer values to register positions such that for any task x waiting upon task y, then task x occupies a higher register position than task y, register position 0 being assigned the value 0;
   substituting a pointer of the same numerical value as the counterpart register position for any given task A that is about to wait upon any given task B where B has a higher register position than task A;
   reiteratively executing at least one selected CPU instruction operating upon the vectored representation including the step of
   translating the field of pointers with and upon itself including the steps of:
   substituting the contents g of register position p for each register position r containing a pointer p;
   continuing said substituting step for the iteration where r, p and g lie in the range greater than or equal to 0 and less than or equal to N;
   indicating deadlock or closure to at least one CPU if task A's register position number occurs in task B's position.

5. A method according to claim 4, wherein the number of repetitions for the detection of closure is no more than one.

6. In a method for allocating one or more serially reusable resources to individual ones of a plurality of tasks in a multiprogramming, multiprocessing CPU environment in which any one task is constrained to wait upon, at most, one other task, each executable task being transferrable to either an active or wait state, upon execution each task being set into the active state starting with a predetermined function in the sequence of functions defined by the program component of the task, the method comprising the steps of:
   requesting a named resource by a task;
   ascertaining resource availability;
   if said resource is available, locking the resource to the requesting task;
   if said resource is not available, testing the effect of whether transferring the requesting task to a wait state would result in a deadlock with other tasks by creating a vectored representation of task waiting relations including the steps of:
   loading in a register a field of N+1 pointers, the pointers and their position order within said register defining wait relations among the tasks;
   assigning to the j th register position the pointer value j;
   reiteratively executing at least one selected CPU instruction operating upon the vectored representation including the steps of
   translating the field of pointers with and upon itself including the steps of:
   substituting the contents g of register position p for each register position r containing a pointer p;
   continuing said substituting step for the iteration where r, p and g lie in the range greater than or equal to 0 and less than or equal to N;
   testing the register for the occurrence of at least one pointer whose value is not equal to j; and
   repeating the translating steps until the set of non-j pointers would remain the same from one iteration to the next, an upper limit of the number of translating steps required being $\leq \lceil \log_2(N+1) \rceil$, such stabilized results being indicative of closure or deadlock; and
   resetting and restarting the requesting task or another task in the set defined by the translated and stabilized set of non-j pointers, if the transfer to the wait state would have resulted in a deadlock.

* * * * *